United States Patent
Albinsson et al.

(10) Patent No.: US 12,251,977 B2
(45) Date of Patent: Mar. 18, 2025

(54) METHOD FOR DAMPING A VEHICLE

(71) Applicant: Volvo Car Corporation, Gothenburg (SE)

(72) Inventors: Anton Albinsson, Gothenburg (SE); Axel Villandseie, Gothenburg (SE); Gobi Kumarasamy, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 240 days.

(21) Appl. No.: 17/963,258

(22) Filed: Oct. 11, 2022

(65) Prior Publication Data

US 2023/0128115 A1    Apr. 27, 2023

(30) Foreign Application Priority Data

Oct. 25, 2021   (EP) ..................................... 21204534

(51) Int. Cl.
*B60G 21/055*   (2006.01)

(52) U.S. Cl.
CPC .... *B60G 21/0555* (2013.01); *B60G 2800/012* (2013.01)

(58) Field of Classification Search
CPC .......... B60G 21/0555; B60G 2800/012; B60G 2400/10; B60G 2500/10; B60G 2600/172; B60G 2600/1871; B60G 17/016; B60G 17/018; B60G 2400/202; B60G 2600/184; B60G 2800/915; B60G 17/08

See application file for complete search history.

(56) References Cited

U.S. PATENT DOCUMENTS

| | | | |
|---|---|---|---|
| 11,306,798 B2 * | 4/2022 | Cox | F16F 9/49 |
| 11,620,970 B1 * | 4/2023 | Patlove | G10D 9/02 84/398 |
| 12,049,115 B2 * | 7/2024 | Furuta | B60G 17/0165 |
| 2014/0005888 A1 * | 1/2014 | Bose | B60G 17/0165 701/37 |
| 2017/0240017 A1 | 8/2017 | Vandersmissen et al. | |
| 2019/0344634 A1 * | 11/2019 | Kim | B60G 17/019 |

(Continued)

FOREIGN PATENT DOCUMENTS

FR    2957306 A3    9/2011

OTHER PUBLICATIONS

Apr. 26, 2022 European Search Report issued in corresponding International Application No. 21204534.

(Continued)

*Primary Examiner* — Richard M Camby
(74) *Attorney, Agent, or Firm* — Clements Bernard Walker; Christopher L. Bernard

(57) ABSTRACT

A computer-implemented method for damping a vehicle, including: receiving external load data for the vehicle; receiving at least one damper velocity of a damper of the vehicle; providing an optimization model configured to describe a relation between external load data for a vehicle, at least one damper velocity of a damper of a vehicle, and at least one damper force of the at least one damper; determining at least one damper force of the damper for the vehicle by inputting the external load data and the at least one damper velocity into the optimization model; and providing the at least one damper force of the at least one damper of the vehicle.

14 Claims, 1 Drawing Sheet

(56) References Cited

U.S. PATENT DOCUMENTS

2021/0283972 A1\* 9/2021 Coerman ............. B60G 17/018
2024/0125371 A1\* 4/2024 Galasso .................... F16F 9/34

OTHER PUBLICATIONS

Heunissen et al., Preview-based techniques for V41'hicle suspension control :a state-of-the-art review, Annual Reviews in Control, Pergamon, Amsterdam, NL, vol. 51, Jan. 1, 2021, pp. 206-235.

\* cited by examiner

METHOD FOR DAMPING A VEHICLE

CROSS-REFERENCE TO RELATED APPLICATION

The present disclosure claims the benefit of priority of co-pending European Patent Application No. 21 204 534.8, filed on Oct. 25, 2021, and entitled "METHOD FOR DAMPING A VEHICLE," the contents of which are incorporated in full by reference herein.

TECHNICAL FIELD

The present disclosure relates to a method for damping a vehicle, to a device for damping a vehicle, to a system and to a computer program element.

BACKGROUND

In the prior art, damping systems for vehicles are known. Damping systems may include one or more of the following a passive damper, an active damper or a semi-active damper. Semi-active dampers use a semi-active suspension to adjust the damping behaviour respectively the damper force of the damper. Such damping systems try to improve a ride and a handling of the vehicle.

In view of this, it is found that a further need exists to provide an improved method for damping a vehicle.

SUMMARY

The problem is at least partially solved or alleviated by the subject matter of the present disclosure.

According to a first aspect of the present disclosure, a computer-implemented method for damping a vehicle is provided, including: receiving external load data for the vehicle; receiving at least one damper velocity of a damper of the vehicle; providing an optimization model configured to describe/represent a relation between external load data for a vehicle, at least one damper velocity of a damper of a vehicle, and at least one damper force of the at least one damper; determining at least one damper force of the damper for the vehicle by inputting the external load data and the at least one damper velocity into the optimization model; providing the at least one damper force of the at least one damper of the vehicle. The term damping, as used herein, is to be understood broadly and relates in particular to a resistance of a movement e.g. reduction of (oscillation, vibration etc.) instability in a device. The term vehicle, as used herein, is to be understood broadly and relates to any vehicle. The vehicle may be a car, a commercial vehicle. The vehicle may have an electric engine, a combustion engine or a hybrid engine. The term external load data, as used herein, is to be understood broadly and relates in particular to a load acting to a vehicle. The external load data may include one or more torques and one or more forces. The external load data may be caused by an unevenness of a road, by an inclination of a road or by an acceleration of the vehicle. The external load data may relate to a load request for the vehicle (e.g. skyhook load request from a controller executing a feedback control for damping the vehicle). The load request for the vehicle may aim to balance the one or more torques and one or more forces acting to the vehicle. The external load is equal to external load data. The term damper velocity, as used herein, is to be understood broadly and relates to a velocity of the damper or at a least of a part of the damper. The damper velocity may be used in combination with a damper parameter set to determine respectively to calculate the generated damper force and/or to the generated damper torque. The damper parameter set may include one or more damper constants and/or one or more damper curves and/or equations. The damper parameter set may describe a damper behavior of a damper and/or a level of damping of a damper. The damper velocity may be measured at the at least one damper. The term damper force, as used herein, is to be understood broadly and relates in particular to a damper force of a damper. The damper force may further be described by a product of a damper parameter set of a damper and a damper velocity of a damper. The determined damper force for the at least one damper may be used to adjust the at least one damper respectively the damper parameter set of the at least one damper. The term optimization model, as used herein, is to be understood broadly and relates to a model configured to describe/represent a relation between at least one damper force of a damper, at least one damper velocity, and external load data. The optimization model may include a damper model including one or more dampers (e.g. four dampers, at each wheel of the vehicle one). The optimization model may calculate an arbitration respectively an distribution of one or more damper forces (e.g. four damper forces for four dampers, one damper for each wheel of the car) in order to balance the external load data. The optimization model may therefore be configured to obtain geometric data (e.g. position of the at least one damper, position of a theoretic load application point etc.). The optimization model may include one or equations describing a behavior (e.g. linear behavior, non-linear behavior, linearized behavior) of the at least one damper. The optimization model include a non-linear solver for solving the one or more equations. The determined damper force may be provided to a control configured to adjust the at least one damper respectively a damper parameter set of the at least one damper in order to generate the at least one damper force in conjunction with the at least damper velocity. The so generated damper force may then balance the acting external load correspond to the load request.

In other words, the present disclosure is based on the finding that controlling a vehicle respectively a vehicle body for improved ride comfort or handling can be achieved by controlling each vertical force (i.e. damper force) in each corner of the vehicle. The most important control variables are modal out-of-plane force and moments, i.e. heave force, roll torque and pitch Torque (i.e. external load data). Current semi-active suspension systems typically determine a reference value for these modal force and torques from the current body motions of the vehicle. The body modal force and moment requests are then distributed to the corners of the vehicle by some simple geometric relations typically assuming that the vertical force actuator can deliver force in any direction, i.e. it is assumed that the requested force can be realized. Furthermore, all methods will have some trade-offs in terms of which body modal force or torque request that is prioritized. The disclosure provides a method how the body modal force and torque request (i.e. external load data) can be distributed and arbitrated to the different corner actuators (i.e. one or more dampers) taking the actuator limitations into account (i.e. force ratio respectively maximum damper force). It also may solve the issue of how weighting factors in the optimization problem (i.e. part of the optimization model respectively cost function) can be tuned using simulations and different road types. This may lead to a more accurate damping of the vehicle. The method may be part of a feedback control for damping a vehicle (e.g. skyhook feedback control). The method may focus on a distribution of one or more damper forces (e.g. four damper forces) to four corners of the car. The method may take heave force, pitch torque, and/or roll torque (i.e. external load data) from any controller (e.g. sky hook controller) that requests those and may distribute them to each damper. The method may do so by adjusting the damper forces. The method may include cost function minimizing an error between the requested body control/torque (i.e. external load data) and the actual body control force/torque (i.e. internal counter load data respectively at least one damper force, e.g. four damper forces).

In an implementation, the external load data may include a heave force for the vehicle, a pitch torque for the vehicle, and/or a roll torque for the vehicle.

In an implementation, the damper velocity may be derived from a measurement of a level sensor arranged at the at least one damper of the vehicle. By forming the derivative of a level of the damper according to a time, the damper velocity can be determined respectively derived. This may be an accurate and an efficient way to determine the damper velocity.

In an implementation, the determining the at least one damper force may include a calculation of an internal counter load for the vehicle, the counter load being derived from the at least one damper force and/or geometric data of the vehicle, and the external load data for the vehicle. The term internal counter load is to be understood broadly and relates in particular to a load configured to balance the external load data. The internal counter load includes the at least one damper force (e.g. four damper forces, one damper force at each damper of the vehicle) and corresponding geometric data of vehicle. The term geometric data is to be understood broadly and relates to spatial positions of one or more dampers, of one or more application points of the external load data. The internal counter load means in the present case the current load provided by the at least one damper under consideration of the geometric data. The internal counter load may include one or more forces and one or more torques. The internal counter load may include a heave force, a roll torque and/or a pitch torque. Internal counter load is equal to internal counter load data.

In an implementation, the determining of the at least one damper force for the at least one damper for the vehicle may include a calculation of a minimum and maximum available damper force of the at least one damper. This may lead to a more accurate way of damping the vehicle.

In an implementation, the determining of the at least one damper force of the at least one damper for the vehicle may include a calculation of at least one force ratio of the at least one damper force and the maximum available damper force of the at least one damper.

In an implementation, the determining of the at least one damper force of the at least one damper for the vehicle may include a minimization of a cost function, the cost function including the external load, the internal load, and/or the force ratio. This may increase an efficiency of damping the vehicle as errors between external load data (i.e. load request) and internal counter load data (i.e. current load) are eliminated or mitigated. The errors may occur, as a provision of exact damper forces is not possible due to limitations of the damper (e.g. maximum available damper force is lower than requested damper force). The errors may occur, as there is sometimes no ideal solution for the internal counter load in order to balance the external load (e.g. due to a conflict of objects between heave force, pitch torque, roll torque and force ratio).

In an implementation, the cost function may include at least one weighting factor and the at least one weighting factor may be determined by an optimization simulation. As heave force, roll torque, pitch torque and force ratio are considered, weighting factors may help to prioritize the determination of the four damper forces. This may increase the accuracy of the method for damping the car. The weighting factors may be determined by an optimization simulation continuously during a ride of the vehicle or offline before a ride of the vehicle. The optimization simulation may include for each term of the cost function a weighting factor. A term in the cost function may include an error term such as a difference between external load data and internal data (e.g. error term for heave force, error term for roll torque, error term for pitch torque) The cost function may also include a term for the force ratio. Each term may be weighted with a weighting factor. For each single external load data a plurality of possible weighting factor combinations are possible. In order to get the best weighting factor combination, the optimization simulation may for example calculate for each possible weighting factor combination of the minimum (e.g. best result) of the cost function and select the best weighting factor combination with the best result. This may lead to a more accurate damping of the vehicle.

The optimization simulation may be like follows: E.g., four terms and weighting factors may be penalized, one for heave force, one for pitch torque, one for roll torque, and one for high damper currents respectively damper forces (Freq/Fmax; i.e. force ratio). A penalty on high currents may bias the solution towards lower current values and thereby may improve secondary ride but slightly may penalize primary ride control. The force ratio terms can therefore be used to balance primary and secondary ride for different types of roads.

The optimization simulation may be alternatively like follows: Initially a range of weighting factors may be provided, which determines a total number of different combinations. Simulations may be performed for each weighting factor combinations and the difference (error) between the controller request based on body motions (i.e. external load data) and with the optimization model determined damper forces for each corner (i.e. internal counter load data) may be stored. For discrete road disturbances (only represents low frequency primary ride), the error amplitudes (from Time Vs Error data) may be considered in the exact discrete times windows at every individual disturbances. For roads that may include high frequency and low frequency disturbances (for example recorded real roads and country roads), the average frequency-amplitude spectrum (through FFT) of errors may be calculated over the entire time with certain overlap. For discrete road disturbances, the RMS of error amplitudes may be calculated from the stored data in the previous step of each combinations. For roads that include high frequency and low frequency disturbances, the average frequency-amplitude spectrum may be divided into four regions. Then the RMS amplitudes of each region may be calculated for each error and then stored in a multi-dimensional array. From the initial benchmark simulations/measurements, the corresponding RMS values of each region in each error may be used to normalize the corresponding RMS amplitudes calculated in the previous step. The normalized RMS error values may be scaled around one. The values lower than one indicate that those results (of certain weights combination) may be lower than the benchmark. If the value may be higher than one, it will indicate that the corresponding weighting factor combination's response may be higher than benchmark. All the simulated weighting factors combination's RMS errors may be normalized with corresponding benchmark RMS error values. Tuning limits may be certain factors, which are set and used to control (filter) the level of improvement in the responses. It simply may represent the minimum normalized RMS value that are allowed in each error. For example, the value 1.02 represents 102% in the response when compared with benchmark (i.e. The response can be 2% excess than benchmark, the weighting factor combinations, for which the response is greater than 2% (against benchmark) are neglected). The tuning limits values may help to define the conditions, which enables the option to focus globally on all errors in all regions or to focus on certain errors in certain regions. Each normalized error may be compared against corresponding tuning limit. In the next step, the only weighting factor combinations that satisfy the above conditions in all regions of the spectrum (0 to 50 Hz) and in all forms of errors may be finally obtained. Rather in discrete road disturbances situation, the only weighting factor combinations that satisfy the conditions in all individual disturbance locations and in all forms of errors may be finally obtained. Once the certain combinations of weighting factors that satisfy all the conditions are available, the next step may be to calculate the cumulative normalized RMS error values. The heave, pitch and roll RMS error values may be added together in each frequency region (primary, choppiness, shake & harshness) separately. Rather in discrete road disturbances situation, heave, pitch and roll RMS error values may be added together in each discrete disturbance time window. Then the total error may be calculated by adding all the region errors or all the individual discrete disturbance time window's errors. The total error may enable the global consideration of all errors in all regions. Rather, the individual region errors can also be considered in the further processes, this may facilitate to focus on the interesting regions alone. Then the total errors may be compared with each other and also with benchmark error (this is always one for a particular error, since three different errors in four regions may be considered, this results the total benchmark error as 12). The minimum total error and corresponding weighting factor values are the optimum solutions. The optimum weighting factors may provide the best solution according to the defined conditions.

In an implementation, the determining of the at least one damper force of the at least one damper for the vehicle may include a calculation of a minimum current and a maximum current for the at least one damper. E.g., for each of the four dampers of the vehicle a respectively minimum current and a respectively maximum current may be determined. This may increase the accuracy of the method for damping the vehicle. Given the current limits for the preview time and the current damper velocity, the maximum and minimum damper force may calculated and may be used as an input to the method. Furthermore, current damper velocity may be measured and may be used as an input to calculate the maximum and minimum damper force. It is also possible to include a future predicted damper velocity in the optimization model.

In an implementation, the external load may derived from at least one acceleration sensor arranged in the vehicle. The acceleration sensor may allow in conjunction with position data of the acceleration sensor to calculate heave force, roll torque and/or pitch torque.

In an implementation, at least one damper may be a semi-active damper. The semi-active damper may include a semi-active suspension used to control respectively adjust a damper parameter set of the damper. By applying a voltage respectively a current to the semi-active suspension, the damper parameter set is adjusted. This may be useful to control actively a damping system in a vehicle.

In an implementation, the vehicle may have four dampers arranged at respective four wheels of the vehicle.

A further aspect relates to a device for damping a vehicle, including: a first receiving unit configured to receive external load data for the vehicle; a second receiving unit configured to receive at least one damper velocity of a damper of the vehicle; a first providing unit configured to provide an optimization model configured to describe a relation between a target load for vehicle, at least one damper velocity of a damper of a vehicle, and at least one damper force of the at least one damper; a determining unit configured to determine at least one damper force of the damper for the vehicle by inputting the external load data and the at least one damper velocity into the optimization model; a providing unit configured to provide the at least one damper force of the at least one damper of the vehicle.

A further aspect relates to a system, including: a device for damping a vehicle as described above; a vehicle.

A last aspect relates to a computer program element, which when executed by a processor being configured to carry out the method as described above, and/or to control a device as described above, and/or to control a system as described above.

BRIEF DESCRIPTION OF THE DRAWINGS

In the following, the disclosure is described exemplarily with reference to the enclosed figures, in which.

Notably, the figures are merely schematic representations and serve only to illustrate an example of the present disclosure. Identical or equivalent elements are in principle provided with the same reference signs.

DESCRIPTION OF EMBODIMENTS

Figure 1:
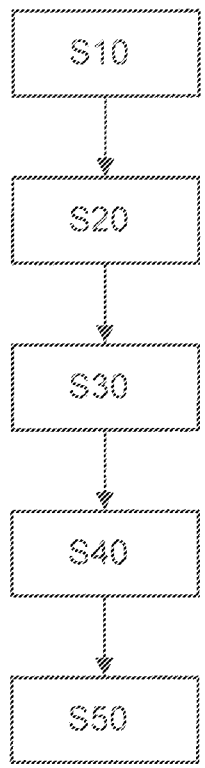
FIG. 1 is a schematic view of the method for damping a vehicle according to an example of the present disclosure.

FIG. 1 shows a schematic view of a method for damping a vehicle according to an example of the present disclosure.

In a first step S10 external load data for the vehicle are received. The external load data may be transmitted from a controller (e.g. feedback controller of a skyhook feedback control). The external load data may include a heave force, a pitch torque, a roll torque. The external load data may alternatively or in addition be derived from a measurement from an acceleration sensor arranged in the vehicle.

Step S20 includes receiving at least one damper velocity of at least one damper of the vehicle. The damper velocity may be derived from a measurement of a level sensor arranged at the at least one damper of the vehicle. The damper may be a semi-active damper. In the present example, four dampers in the vehicle are considered. The dampers are arranged at the wheels of the vehicle respectively in the corners of the vehicle in the present example.

Step S30 providing an optimization model configured to describe a relation between external load data for a vehicle, at least one damper velocity of a damper of a vehicle, and at least one damper force of the at least one damper.

Step S40 includes determining at least one damper force of the damper for the vehicle by inputting the external load data and the at least one damper velocity into the optimization model. The determining the at least one damper force may include a calculation of an internal counter load for the vehicle. The internal counter load may be derived from the at least one damper force and/or geometric data of the vehicle, and the external load data for the vehicle. The determining of the at least one damper force of the at least one damper for the vehicle may include a calculation of a minimum and maximum available damper force of the at least one damper. The determining of the at least one damper force of the at least one damper for the vehicle may include a calculation of at least one force ratio of the at least one damper force and the maximum available damper force of the at least one damper. The determining of the at least one damper force of the at least one damper for the vehicle may include a minimization of a cost function, the cost function including the external load, the internal load, and/or the force ratio. The cost function may include at least one weighting factor and the at least one weighting factor may be determined by an optimization simulation. The determining of the at least one damper force of the at least one damper for the vehicle may include a calculation of a minimum current and a maximum current for the at least one damper.

Step S50 includes providing the at least one damper force of the at least one damper of the vehicle. The determined at least one damper force may be provided to a control configured adjust a current of the at least one damper based on the information of the damper force.

Figure 2:
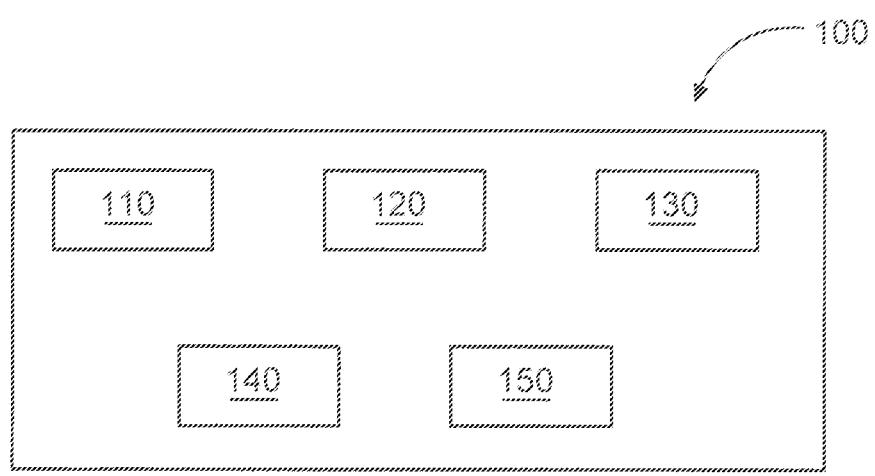
FIG. 2 is a schematic view of a device for damping a vehicle according to an example of the present disclosure.

FIG. 2 shows a schematic view of a device 100 for damping a vehicle (not shown). The device 100 includes a first receiving unit 110 configured to receive external load data for the vehicle; a second receiving unit 120 configured to receive at least one damper velocity of a damper (not shown) of the vehicle; a first providing unit 130 configured to provide an optimization model configured to describe a relation between a target load for vehicle, at least one damper velocity of a damper of a vehicle, and at least one damper force of the at least one damper; a determining unit 140 configured to determine at least one damper force of the damper for the vehicle by inputting the external load data and the at least one damper velocity into the optimization model; a second providing unit 150 configured to provide the at least one damper force of the at least one damper of the vehicle. The first receiving unit 110, the second receiving unit 120, the first providing unit 130, the determining unit 140 and the second providing unit 150 may also be implemented in a single hardware unit and/or software unit (e.g. in some aspects of the present disclosure one unit or control circuitry may perform the respective steps). Units and/or devices according to one or more example examples may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. The unit or device may include one or more interface circuits. The functionality of any given unit of the present disclosure may be distributed among multiple unit that are connected via interface circuits. For example, multiple unit may allow load balancing.

Other variations to the disclosed example can be understood and effected by those skilled in the art in practicing the claimed subject matter, from the study of the drawings, the disclosure, and the appended claims. In particular, respective parts/functions of the respective examples described above may also be combined with each other. In the claims, the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

The invention claimed is:

1. A computer-implemented method for damping a vehicle, comprising:
 receiving external load data for the vehicle, wherein the external load data relates to a load request for the vehicle;
 receiving at least one damper velocity of a damper of the vehicle;
 providing an optimization model configured to describe a relation between external load data relating to a load request for a vehicle, at least one damper velocity of a damper of a vehicle, and at least one damper force of the at least one damper;
 determining at least one damper force of the damper for the vehicle by inputting the external load data and the at least one damper velocity into the optimization model, comprising a calculation of at least one force ratio of the at least one damper force and the maximum available damper force of the at least one damper;
 wherein the optimization model calculates a distribution of one or more damper forces in order to balance the external load data, taking the maximum available damper force into account; and
 providing the at least one damper force of the at least one damper of the vehicle.

2. The method according to claim 1, the external load data comprising a heave force for the vehicle, a pitch torque for the vehicle, and/or a roll torque for the vehicle.

3. The method according to claim 1, the damper velocity being derived from a measurement of a level sensor arranged at the at least one damper of the vehicle.

4. The method according to claim 1, the determining the at least one damper force comprises a calculation of an internal counter load for the vehicle, the counter load being derived from the at least one damper force and/or geometric data of the vehicle, and the external load data for the vehicle.

5. The method according to claim 1, the determining of the at least one damper force of the at least one damper for the vehicle comprising a calculation of a minimum and maximum available damper force of the at least one damper.

6. The method according to claim 1, the determining of the at least one damper force of the at least one damper for the vehicle comprising a minimization of a cost function, the cost function comprising the external load, the internal load, and/or the force ratio.

7. The method according to claim 6, the cost function comprising at least one weighting factor and the at least one weighting factor being determined by an optimization simulation.

8. The method according to claim 1, the determining of the at least one damper force of the at least one damper for the vehicle comprises a calculation of a minimum current and a maximum current for the at least one damper.

9. The method according to claim 1, the external load being derived from at least one acceleration sensor arranged in the vehicle.

10. The method according to claim 1, the at least one damper being a semi active damper.

11. The method according to claim 1, the vehicle having four dampers arranged at respective four wheels of the vehicle.

12. A device for damping a vehicle, comprising:
- a first receiving unit configured to receive external load data for the vehicle, wherein the external load data relates to a load request for the vehicle;
- a second receiving unit configured to receive at least one damper velocity of a damper of the vehicle;
- a first providing unit configured to provide an optimization model configured to describe a relation between a target load for vehicle, at least one damper velocity of a damper of a vehicle, and at least one damper force of the at least one damper;
- a determining unit configured to determine at least one damper force of the damper for the vehicle by inputting the external load data and the at least one damper velocity into the optimization model, comprising a calculation of at least one force ratio of the at least one damper force and the maximum available damper force of the at least one damper;
- wherein the optimization model calculates a distribution of one or more damper forces in order to balance the external load data, taking the maximum available damper force into account; and
- a second providing unit configured to provide the at least one damper force of the at least one damper of the vehicle.

13. A non-transitory computer readable medium comprising instructions for damping a vehicle stored in a memory and executed by a processor to carry out steps comprising:
- receiving external load data for the vehicle, wherein the external load data relates to a load request for the vehicle;
- receiving at least one damper velocity of a damper of the vehicle;
- providing an optimization model configured to describe a relation between external load data relating to a load request for a vehicle, at least one damper velocity of a damper of a vehicle, and at least one damper force of the at least one damper;
- determining at least one damper force of the damper for the vehicle by inputting the external load data and the at least one damper velocity into the optimization model, comprising a calculation of at least one force ratio of the at least one damper force and the maximum available damper force of the at least one damper;
- wherein the optimization model calculates a distribution of one or more damper forces in order to balance the external load data, taking the maximum available damper force into account; and
- providing the at least one damper force of the at least one damper of the vehicle.

14. The method according to claim 1, wherein the cost function comprises a term for heave force, for pitch torque, for roll torque, and for force ratio, each term weighted with a weighting factor.

* * * * *